United States Patent [19]

Koyama

[11] Patent Number: 4,502,578
[45] Date of Patent: Mar. 5, 1985

[54] ELECTROMAGNETIC SPRING-WOUND CLUTCH

[75] Inventor: Kinichi Koyama, Kiryu, Japan

[73] Assignee: Ogura Clutch Co., Ltd., Kiryu, Japan

[21] Appl. No.: 421,480

[22] Filed: Sep. 22, 1982

[30] Foreign Application Priority Data

Oct. 2, 1981 [JP] Japan .................. 56-157354

[51] Int. Cl.³ .................. F16D 13/02; F16D 13/08
[52] U.S. Cl. .................. 192/26; 192/33 C; 192/40; 192/81 C; 192/84 T
[58] Field of Search .................. 192/33 C, 26, 28, 40, 192/81 C, 84 T, 90, 12 BA

[56] References Cited

U.S. PATENT DOCUMENTS

| | | | |
|---|---|---|---|
| 3,206,212 | 9/1965 | Wallace et al. | 192/28 X |
| 3,451,512 | 6/1969 | Sacchini et al. | 192/12 BA |
| 3,521,730 | 7/1970 | Weatherby | 192/12 BA |
| 3,559,232 | 2/1971 | Crane | 192/12 BA X |
| 3,637,056 | 1/1972 | Baer | 192/84 T X |
| 3,726,372 | 4/1973 | Baer et al. | 192/33 C X |
| 3,905,458 | 9/1975 | Mehrbrodt | 192/26 |
| 4,191,283 | 3/1980 | Keeny | 192/33 C X |

Primary Examiner—Rodney H. Bonck
Attorney, Agent, or Firm—Frishauf, Holtz, Goodman and Woodward

[57] ABSTRACT

In an electromagnetic spring-wound clutch, an input rotary member is concentrically and rotatably fitted on an output rotary member having an annular enlarged portion, with its axial boss disposed adjacent the above annular enlarged portion. A coil spring is wound around the axial boss and the annular enlarged portion for gripping engagement with at least the former, with its one end engaged by the output rotary member and its other end by a sleeve concentrically and rotatably supported on the input and output rotary members. An armature is disposed for axial tilting about its one edge supported by a stationary member. Responsive to extinction of electromagnetic force caused by deenergization of a magnetic coil, the armature is axially tilted by the force of a spring into engagement with the sleeve to hold same from rotating. When the armature is out of engagement with the sleeve, the coil spring is wound up into gripping engagement with the input and output rotary members to cause driving coupling therebetween.

5 Claims, 8 Drawing Figures

ELECTROMAGNETIC SPRING-WOUND CLUTCH

BACKGROUND OF THE INVENTION

This invention relates to an electromagnetic spring-wound clutch, and more particularly to an electromagnetic spring-wound clutch in which the output rotary member can be stopped at any rotational position, and which can be compact in size.

An electromagnetic spring-wound clutch is well known, which comprises an input rotary member, an output rotary member disposed concentrically with the input rotary member, an axially movable collar, a coil spring disposed for gripping engagement with a clutch surface of the input rotary member and engaged at its opposite ends by the output rotary member and the collar, and driving means for electromagnetically driving the collar. As the collar is moved axially of the output rotary member by the driving means, the coil spring comes into or out of gripping engagement with the clutch surface of the input rotary member for causing engagement or disengagement of the clutch.

As known by U.S. Pat. No. 3,637,056, for instance, the above driving means can be formed by an electromagnetic coil, which is adapted to be energized or deenergized to cause generation or extinction of a magnetic flux for magnetic attraction of the collar for engagement or disengagement of the clutch. However, according to this conventional clutch, it is impossible to stop the output rotary member at a predetermined rotational position.

In recent years, electromagnetic spring-wound clutches of this kind have widely been used in the power transmission systems of electronic copying machines, etc. Electromagnetic spring-wound clutches for use with these apparatus are required to be compact in size as well as high in responsiveness of torque transmission. In addition, they should be constructed such that the output rotary member can be stopped after each one rotation, after each predetermined angle of rotation or after each predetermined number of rotations.

Electromagnetic spring-wound clutches which can comply with the above requirements have been proposed e.g. by U.S. Pat. No. 3,521,730 and U.S. Pat. No. 3,559,781. These clutches each comprise an input rotary member, an output rotary member, and a stop collar, which are disposed concentrically with each other, and further comprise a clutch spring engaged at its opposite ends by the output rotary member and the stop collar and disposed for gripping engagement with an outer peripheral surface of the input rotary member, a brake spring engaged at its opposite ends by the output rotary member and the stop collar, and disposed for gripping engagement with an outer peripheral surface of the output rotary member, an electromagnetic coil disposed opposite an outer peripheral surface of the stop collar, and a stop lever disposed for stopping rotation of the stop collar. The stop collar has its outer peripheral surface formed with a stop shoulder for engagement with an engaging end of the stop lever. When the stop lever is not operated, the clutch spring, which has its one end engaged by the output rotary member, grippingly engages the input rotary member to keep driving coupling of the input rotary member with the output rotary member. On the other hand, when the stop lever is operated, the engaging end of the stop lever engages the stop shoulder of the stop collar to prohibit rotation of the stop collar, and the resulting relative rotation of the stop collar and the output rotary member causes expansion of the clutch spring to release the driving coupling of the input and output rotary members, and simultaneously causes contraction of the brake spring into gripping engagement with the output rotary member to cause disengagement of the clutch and simultaneously stop the output rotary member at a predetermined position.

According to the proposed clutches, the output rotary member can be stopped at any desired rotational position. However, since the clutches each include more than one coil spring and a stop lever arranged at a location radially outward of the stop collar, they are inevitably large in axial size as well as in radial size, making it difficult to design them compact in size.

OBJECTS AND SUMMARY OF THE INVENTION

It is an object of the invention to provide an electromagnetic spring-wound clutch which is adapted to stop the output rotary member exactly at any desired or preselected rotational position, and is compact in size.

It is a further object of the invention to provide an electromagnetic spring-wound clutch which can transmit torque with high responsiveness and can operate with high reliability.

It is another object of the invention to provide an electromagnetic spring-wound clutch which has a simplified construction and is easy to manufacture.

According to the present invention, an output rotary member has a tubular portion and an annular enlarged portion radially outwardly extending from the tubular portion. The tubular portion of the output rotary member carries an input rotary member concentrically and rotatably fitted thereon, with the enlarged portion disposed adjacent an axial boss of the input rotary member. A tubular member is disposed concentrically of the output rotary member and the input rotary member and rotatably supported by these members, defining an annular space between the tubular member, the enlarged portion of the output rotary member, and the axial boss of the input rotary member. First engaging means is provided on one end of the tubular member. A coil spring is accommodated within the annular space and wound around the enlarged portion of the output rotary member and the axial boss of the input rotary member, with its one end engaged by the enlarged portion of the output rotary member, and its other end by the tubular member, respectively, for gripping engagement with at least the axial boss of the input rotary member. The coil spring is adapted for contraction to grippingly engage at least the axial boss of the input rotary member when the tubular member is freely rotatable, and for expansion as the output rotary member rotates in a predetermined direction when the tubular member is prohibited from rotating. An armature is arranged opposite the above one end of the tubular member and has its one edge provided with second engaging means for engagement with the first engaging means to prohibit rotation of the tubular member. Means is provided, which supports another edge of the armature radially opposite to the above one edge, at a fixed position, while allowing the armature to tilt axially of the output rotary member about the above another edge. An electromagnetic coil is provided for generating electromagnetic force when energized, which causes the axial tilting of the armature. During rotation of the input rotary member, the tilting of the armature is controlled in dependence upon generation of electromagnetic force by the electromagnetic coil, to cause engagement or disengagement of the second engaging means with the first engaging means, whereby the input rotary member and the output rotary member are drivingly coupled together or disengaged from each other, through the coil spring.

Preferably, elastic means is disposed to permanently urge the armature in a direction of engagement of the second engaging means with the first engaging means. The armature is arranged for displacement against the urging force of the elastic means in another direction of disengagement of the second engaging means from the first engaging means, when the electromagnetic coil is energized.

The above and other objects, features and advantages of the invention will be more apparent from the ensuing detailed description taken in connection with the accompanying drawings.

DETAILED DESCRIPTION

A preferred embodiment of the present invention will now be described in detail with reference to the accompanying drawings.

Figure 1:
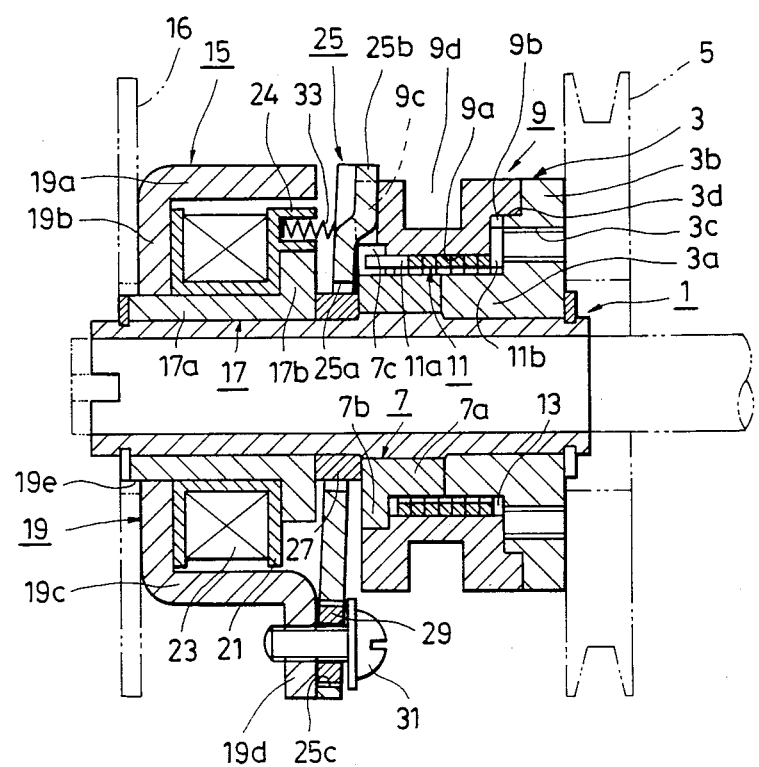
FIG. 1 is a longitudinal sectional view taken along line I—I in FIG. 3 and showing an electromagnetic spring-wound clutch according to an embodiment of the present invention, which is in an disengaged position.

Referring first to FIG. 1, an electromagnetic spring-wound clutch according to the invention is illustrated, which is seen in a disengaged position. An output shaft 1, which is in the form of a tubular member and forms part of an output rotary member, is adapted for driving coupling with an input shaft of a driven apparatus, not shown. An input hub 3, forming an input rotary member, is rotatably fitted on one end portion of the output shaft 1. The input hub 3 comprises a boss 3a extending axially of the output shaft 1 and rotatably fitted thereon, and an annular flange 3b extending radially of the output shaft 1. The flange 3b has a threaded hole 3c axially extending therethrough and adapted to mount a grooved pulley 5 for driving coupling with an external driver, not shown, onto the input hub 3 by means of a screw, not shown, fitted in the hole 3c.

An annular member 7 is spline-fitted on an intermediate portion of the output shaft 1 for rotation in unison therewith. The annular member 7 and the output shaft 1 form the output rotary member, wherein the annular member 7 forms an enlarged portion of the same member. The annular member 7 comprises a boss 7a extending axially of the output shaft 1 and an annular flange 7b radially outwardly from an end of the boss 7a remote from the input hub 3. The boss 7a is disposed adjacent the boss 3a of the input hub 3, with its outer peripheral surface extending flush with the outer peripheral surface of the latter in the illustrated embodiment. The flange 7b of the annular member 7 has its outer peripheral surface formed with an axial groove 7c in which one end of a coil spring 11, hereinlater referred to, is received. Further, the flange 7b rotatably supports at its outer peripheral surface a sleeve or tubular rotary member 9 in cooperation with a stepped shoulder 3d formed in an end face of the flange 3a of the input hub 3 facing the annular member 7. This sleeve 9 has its one end face remote from the input hub 3 located on substantially the same plane with a corresponding end face of the annular member 7 and has an outer diameter substantially equal to that of the input hub 3. Further, it has such an inner diameter that an annular space 13 is defined between the inner peripheral surface 9a of the sleeve 9 and the outer peripheral surfaces of the boss 3a of the input hub 3 and the boss 7a of the annular member 7, which accommodates the coil spring 11. The sleeve 9 has a radial groove 9b formed in an inner peripheral surface near its one end facing the input hub 3, in which the other end 11b of the coil spring 11 is received. The sleeve 9 further has a radial recess 9c in the form of a slit, formed in an end face remote from the input hub 3, in which a protuberance 25b of an armature 25, hereinlater referred to, is received. Preferably, an annular recess 9d is formed in an outer peripheral surface of the sleeve 9 at its intermediate portion, for reducing the weight and enhancing the responsiveness of the clutch.

The coil spring 11 is formed of a wire suitable for use as a spring and having a rectangular cross section, and has its axially extending end 11a engaged in the groove 7c, and its radially extending opposite end 11b in the groove 9b, respectively. When the sleeve 9 is in a freely rotatable state, the coil spring 11 is in gripping engagement with the outer peripheral surfaces of the boss 3a of the input hub 3 and the boss 7b of the annular member 7. That is, the coil spring 11 has an inner diameter smaller than the outer diameter of the bosses 3a and 7a, when it is in a free state before its incorporation into the clutch. The coil spring 11 has its winding directed such that when the end 11b engaged in the groove 9b of the sleeve 9 is impeded from rotating about the output shaft 1, it becomes expanded as the other end 11a engaged in the groove 7c of the annular member 7 is rotated in unison with the annular member 7 in the same direction of rotation of the output shaft 1, to release itself from its gripping engagement with the bosses 3a and 7a.

Figure 4:
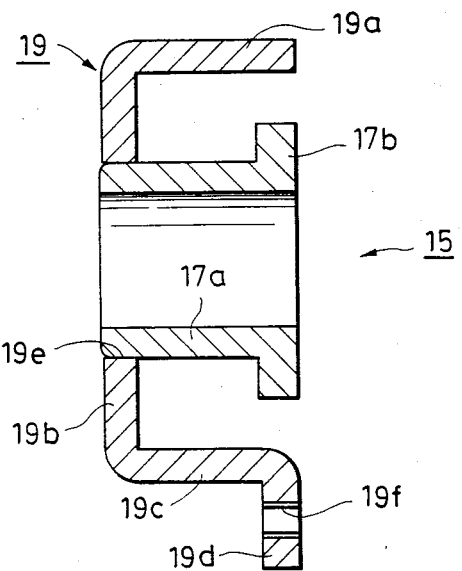
FIG. 4 is a longitudinal sectional view taken along line IV—IV in FIG. 5 and showing a field core provided in the clutch of FIG. 1.
Figure 5:
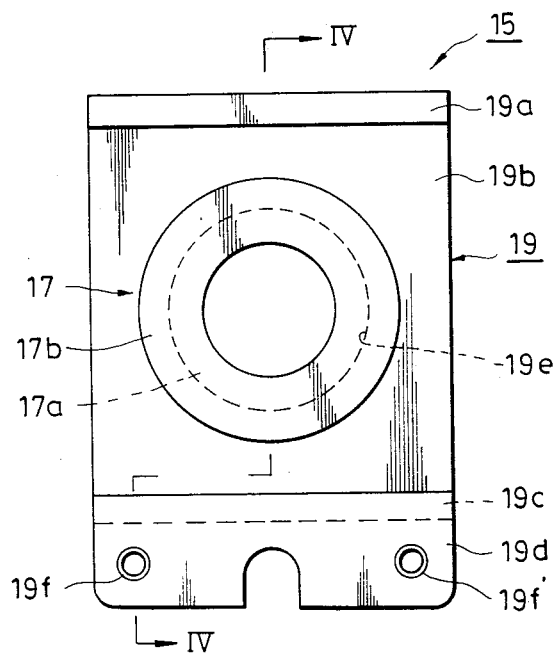
FIG. 5 is a front view of the field core of FIG. 4.

A field core 15 is rotatably supported on an end portion of the output shaft 1 remote from the input hub 3, in concentricity with the output shaft 1, and is fixed at one end wall to a stationary mounting plate 16 forming part of a driven apparatus, not shown. As best shown in FIGS. 4 and 5, the field core 15 comprises an inner pole element 17 and an outer pole element 19 integrally joined with the former. The inner pole element 17 comprises an axial boss 17a rotatably fitted on the output shaft 1, and an annular flange 17b radially outwardly extending from an end of the boss 17a facing toward the sleeve 9. The outer pole element 19 comprises a pair of upper and lower wall portions 19a and 19c axially extending parallel with each other in spaced relation, and a vertical wall portion radially extending between ends of the upper and lower wall portions 19a and 19c in relation spaced from the flange 17b. The lower wall portion 19c is formed integrally with a mounting flange 19d radially outwardly extending from an edge facing the sleeve 9, for mounting an armature 25, hereinlater referred to. In the illustrated embodiment, the upper wall portion 19a, the mounting flange 19d and the flange 17b have their end faces facing toward the sleeve 9 and located on the same plane. The boss 17a of the inner pole element 17 is rigidly fitted in a central hole 19e formed in the vertical wall portion 19b of the outer pole element 19. Preferably, the outer pole element 19 is formed of a single-piece metal plate by punching same to form the above central hole 19e therein, and then pressing same into the above described configuration.

Reverting to FIG. 1, an annular bobbin 21, which carries an electromagnetic coil 23 wound thereon, is rigidly fitted on the boss 17a of the inner pole element 17. The bobbin 21 has two spring housings 24 and 24', only one of which is shown in FIGS. 1 and 2, transversely symmetrically arranged at an end wall facing toward the sleeve 9 at a location near the upper wall portion 19a, which housings are preferably formed integrally with the bobbin body.

Figure 6:
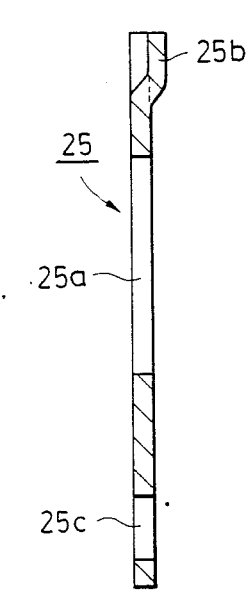
FIG. 6 is a longitudinal sectional view taken along line VI—VI in FIG. 7 and showing an armature provided in the clutch of FIG. 1.
Figure 7:
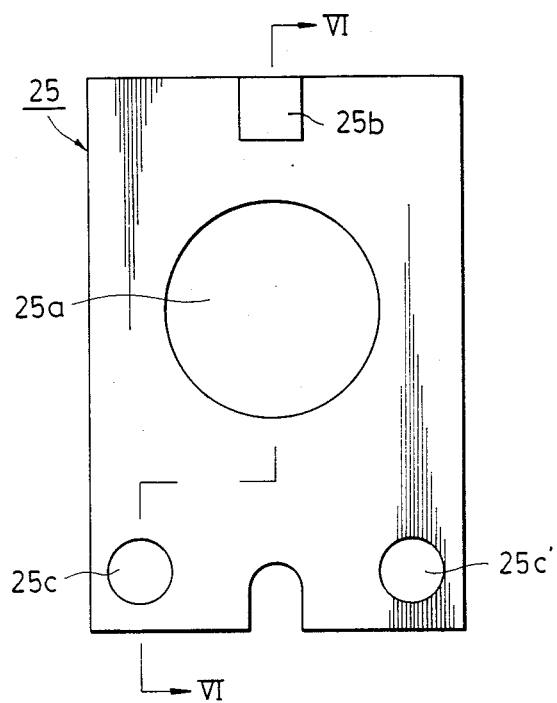
FIG. 7 is a front view of the armature of FIG. 6.

The armature 25 is loosely fitted on the output shaft 1 at a location between the field core 15 and the sleeve 9, with its lower edge supported by the field core 15 for axial tilting about the same edge. As shown in detail in FIGS. 6 and 7, the armature 25 is preferably formed of a one-piece metal plate pressed into a plate-like configuration. It has its central portion formed with a through hole 25a, through which extends a collar or spacer 27 which is fitted on the output shaft 1. This through hole 25a has such a diameter as it does not interfere with the spacer 27 during axial tilting of the armature 25. The spacer 27 maintains the field core 15 and the annular member 7 in relation spaced from each other at such a distance as to allow axial tilting of the armature 25 through a required angle. The armature 25 is formed with an axial protuberance 25b having a rectangular section, projecting from an upper central edge portion facing the sleeve 9, and engageable into the recess 9c of the sleeve 9 or disengageable therefrom with axial tilting of the armature 25, to impede or allow rotation of the sleeve 9 about the output shaft 1. The armature 25 also has two through holes 25c and 25c' formed in a lower edge portion facing the mounting flange 19d of the field core 15 and arranged symmetrically with respect to the through hole 25a, as shown in FIG. 7. Loosely fitted in these holes 25c and 25c' are bushes 29 and 29', made of metal or rubber, only one of which is shown in FIGS. 1 and 2. Screws 31, 31' extend through these bushes 29 and 29' into threaded engagement with threaded holes 19f and 19f', shown in FIG. 5, formed in the mounting flange 19d to support the lower edge of the armature 25 on the mounting flange 19d in an axially tiltable manner.

Figure 2:
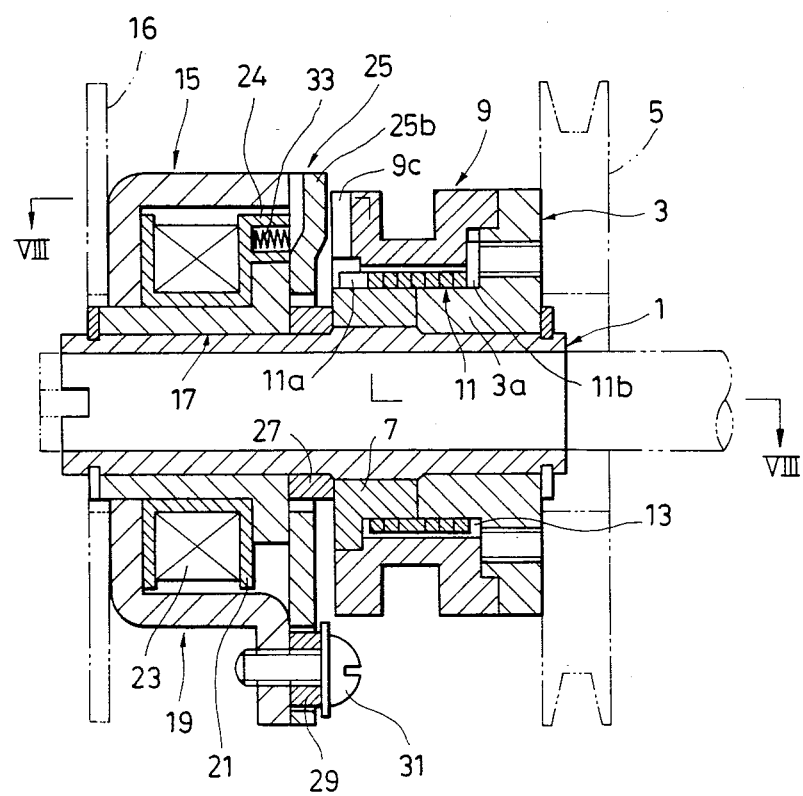
FIG. 2 is a view similar to FIG. 1, showing the same clutch in an engaged position.
Figure 3:
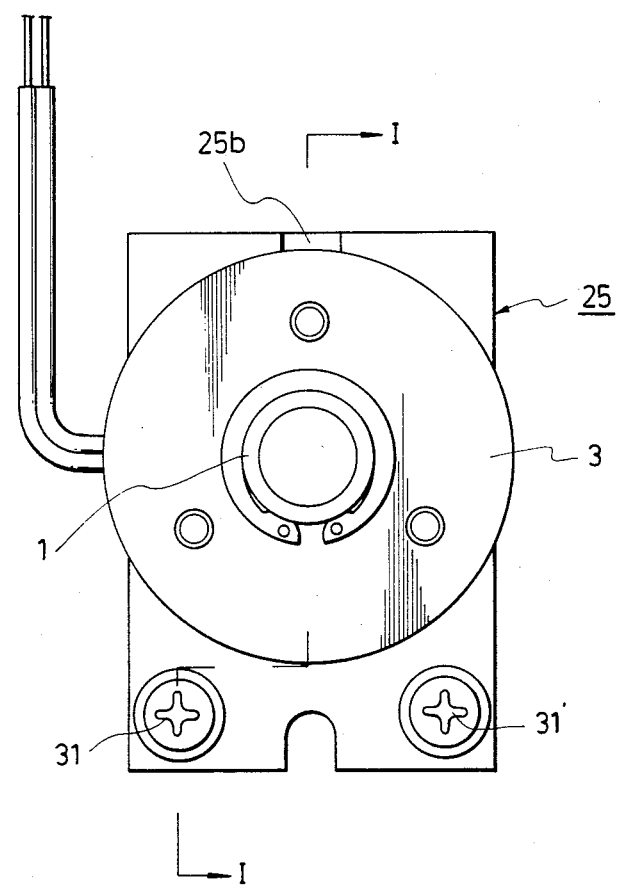
FIG. 3 is a front view of the electromagnetic spring-wound clutch in FIG. 1.

As shown in FIGS. 1 and 2, compression springs 33 and 33', only one of which is shown, are arranged in a taut state between the electromagnetic coil 23 and the armature 25, with their one ends insertedin their respective housings 24 and 24' and their other ends in urging contact with an end face of the armature 25 facing the field core 15, thus permanently urging the armature 25 toward the sleeve 9.

Figure 8:
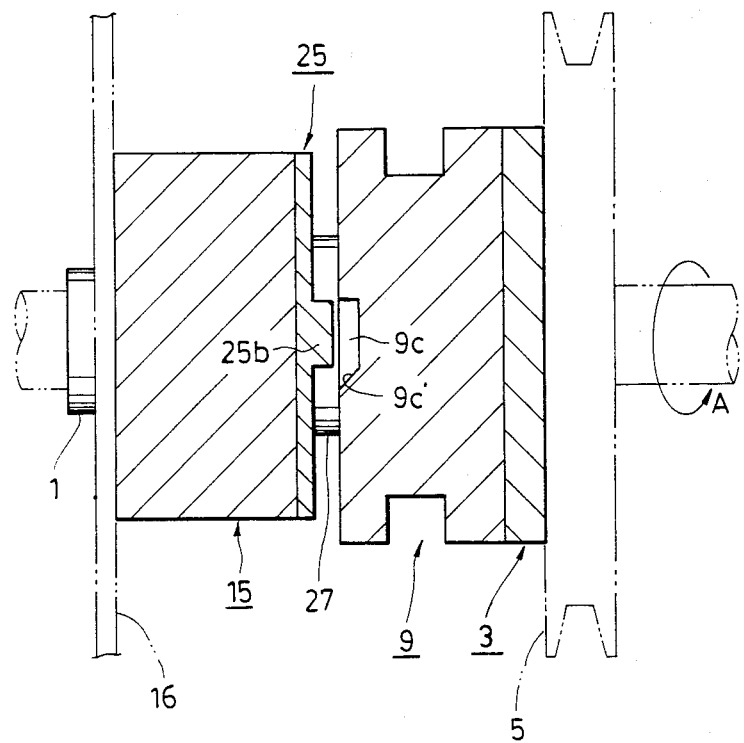
FIG. 8 is a horizontal sectional view taken along line VIII—VIII in FIG. 2.

The recess 9c, in the form of a slit, of the sleeve 9 may preferably be shaped such that a side portion of the recess 9c, which extends from a side edge first approaching the protuberance 25b during rotation of the sleeve 9 in the direction of the arrow A in FIG. 8 and terminates in the bottom, is tapered with its depth gradually increasing toward the opposite side edge of the same recess so as to ensure smooth and positive fitting of the protuberance 25b into the recess.

The operation of the electromagnetic spring-wound clutch constructed above is as follows: First, let it be assumed that the clutch is in a position as shown in FIG. 1, that is, the protuberance 25b of the armature 25 is engaged in the recess 9c of the sleeve 9. When the electromagnetic coil 23 is energized, a magnetic flux is formed, which starts from the coil 23 and extends through the inner pole element 17 and outer pole element 19 of the field core 15, and the armature 25. The magnetic flux causes magnetic attraction of the armature 25 toward the field core 15 to bring the armature 25 into a position closer to the field core 15 against the elastic force of the compression coil springs 33 and 33' until the armature 25 comes into urging contact with the inner pole element 17 and the outer pole element 19. Simultaneously, the protuberance 25b of the armature 25 is disengaged from the recess 9c of the sleeve 9, as shown in FIG. 2. In the position in FIG. 2, the sleeve 9 can be freely rotated. Accordingly, the coil spring 11, which was expanded in diameter against its own elasticity in the position in FIG. 1, becomes contracted into gripping engagement at its inner peripheral surface with the outer surface of the boss 3a of the input hub 3, while simultaneously causing the sleeve 9 to rotate. Consequently, the coil spring 11 is rotated in unison with the input hub 3. At the same time, the annular member 7 engaging the end 11a of the coil spring 11 and the output shaft 1 combined with the annular member 7 are rotated in unison with the input hub 3 through the coil spring 11. In the above described manner, torque is transmitted from the input side to the output side, immediately upon energization of the electromagnetic coil 23.

Then, when the electromagnetic coil 23 is deenergized, the magnetic flux extending through the field core 15 and the armature 25 is extinguished to release the armature 25 from the magnetic attraction toward the field core 15. The armature 25 is immediately axially tilted toward the sleeve 9 about its lower edge supported by the mounting flange 19d, due to the uring force of the compression springs 33 and 33'. When the recess 9c in the sleeve 9 comes to a position facing the protuberance 25b of the armature 25 within one rotation of the sleeve 9 after the above tilting of the armature 25, the protuberance 25b is fitted into the recess 9c to forcedly stop the rotation of the sleeve 9. On this occasion, the end 11b of the coil spring 11 engaged by the stopped sleeve 9 is prohibited from rotating about the output shaft 1, whereas the other end 11a engaged by the annular member 7 continues to rotate in unison with rotation of the annular member 7 due to the inertia of the output rotary member, which causes expansion of the coil spring 11 to detach the inner peripheral surface of the spring 11 from the outer peripheral surface of the boss 3a of the input hub 3, as in the position of FIG. 1. Then, the coil spring 11 no longer grips the boss 3a of the input hub 3 to release the input hub 3 and the annular member 7 from their driving coupling, interrupting the torque transmission. At the same time, the annular member 7, i.e. output shaft 1 is stopped from rotating, which is connected, through the spring 11, with the sleeve 9 which has then been forcedly stopped from rotating. Thereafter, the coil spring 11 is kept in an expanded state, because the contracting force of the coil spring 11 due to its own elasticity is not so large as to cause reversal of the rotation of the annular member 7 and the output shaft 1 against loads acting upon these members 7 and 1, inclusive of those imparted by the driven apparatus.

In the above described manner, immediately upon deenergization of the electromagnetic coil 23, the clutch is brought into a disengaged position as shown in FIG. 1, where no torque transmission takes place from the input side to the output side.

Although in the illustrated embodiment, the electromagnetic spring-wound clutch is adapted to stop its output rotary member after each at least one rotation of the same member, a plurality of recesses similar to the recess 9c may be provided in the sleeve 9 in a circumferentially spaced arrangement, to enable stopping the output rotary member after each rotation through a predetermined angle. For instance, if four such recesses are provided at circumferentially equal intervals, the output rotary member can be stopped after each rotation through an angle of 90 degrees. Furthermore, by providing a plurality of such recesses, a period of time can be shortened, which is required for starting or interrupting the torque transmission to the output rotary member, and for stopping the same member, after energization of the electromagnetic coil 23.

As set forth above, according to the electromagnetic spring-wound clutch of the invention, the output rotary member can be positively stopped after each one rotation, after each predetermined angle of rotation, or after any predetermined number of rotations. Having a uniaxial construction, the clutch can be designed compact in size. Also, it has high responsiveness of torque transmission and interruption, enhancing the performances of various apparatuses used with the clutch. Further, the clutch has a reduced number of component parts, and a simplified construction, and therefore can be fabricated with ease and at low costs.

Obviously many modifications and variations of the present invention are possible in the light of the above teachings. It is therefore to be understood that within the scope of the appended claims the invention may be practiced otherwise than as specifically described.

What is claimed is:

1. An electromagnetic spring-wound clutch comprising:
    an output rotary member having a tubular portion and an annular enlarged portion radially outwardly extending from said tubular portion;
    an input rotary member concentrically and rotatably fitted on said tubular portion of said output rotary member, said input rotary member having an axial boss disposed adajcent said annular enlarged portion of said output rotary member;
    a tubular member disposed concentrically of said output rotary member and said input rotary member and rotatably supported thereby, said tubular member defining an annular space between said tubular member, said annular enlarged portion of said output rotary member and said axial boss of said input rotary member;
    first engaging means provided on one end of said tubular member;
    a coil spring accommodated within said annular space and wound around said annular enlarged portion of said output rotary member and said axial boss of said input rotary member for gripping engagement with at least the latter, said coil spring having one end engaged by said annular enlarged portion of said output rotary member and another end by said tubular member, respectively, said coil spring being adapted for contraction to grippingly engage at least said axial boss of said input rotary member when said tubular member is freely rotatable, and for expansion as said output rotary member rotates in a predetermined direction when said tubular member is prohibited from rotating;
    an armature arranged adajcent said one end of said tubular member;
    second engaging means provided on one edge of said armature for engagement with said first engaging means to prohibit rotation of said tubular member;
    a field core arranged concentrically with said tubular portion of said output rotary member on a side of said armature remote from said tubular member;
    means supporting another edge of said armature radially opposite to said one edge thereof, at a fixed position, said armature supporting means having a radially extending flange formed on said field core and disposed adjacent said another edge of said armature so that said another edge of said armature is directly supported by said field core, at least one through hole formed in said another edge of said armature, at least one bush loosely fitted in said at least one through hole, and means fixing said at least one bush to said radially extending flange of said field core, said armature supporting means being adapted to allow said armature to tilt axially of said output rotary member about said another edge thereof;
    elastic means permanently urging said armature in a direction of engagement of said second engaging means with said first engaging means;
    a bobbin rigidly fitted in said field core and formed with a housing for receiving said elastic means at a location adjacent said one edge of said armature; and
    an electromagnetic coil wound around said bobbin and adapted to generate electomagnetic force when energized, for causing said axial tilting of said armature;
    wherein said armature is arranged for displacement against the urging force of said elastic means in another direction of disengagement of said second engaging means from said first engaging means, when said electromagnetic coil is energized; and
    during rotation of said input rotary member, said axial tilting of said armature is controlled in dependence upon generation of electromagnetic force by said electromagnetic coil, to cause engagement or disengagement of said second engaging means with said first engaging means, whereby said input rotary member and said output rotary member are drivingly coupled together or disengaged from each other, through said coil spring.

2. The electromagnetic spring-wound clutch as claimed in claim 1, wherein said first engaging means comprises at least one recess formed in an end face of said one end of said tubular member, and said second engaging means comprises at least one protuberance formed in an end face of said one end of said armature and engageable in said at least one recess.

3. The electromagnetic spring-wound clutch as claimed in claim 2, wherein said recess of said tubular member has a side portion extending from a side edge thereof first approaching said protuberance during rotation of said tubular member in a direction the same as said output rotary member, said side portion having a depth gradually increasing toward an opposite side edge of said recess.

4. The electromagnetic spring-wound clutch as claimed in claim 1 wherein said field core comprises: an inner pole element having an axially extending boss through which said tubular portion of said output rotary member concentrically and rotatably extends, said boss of said inner pole element carrying said electromagnetic coil fitted thereon, and an annular flange radially outwardly extending from an end of said boss of said inner pole element facing toward said tubular member; and an outer pole element hwving a pair of first and second wall portions axially extending in parallel and spaced relation to each other, and a third wall portion radially extending between said first and second wall portions in relation spaced from said annular flange of said inner pole element.

5. The electromagnetic spring-wound clutch as claimed in claim 1, wherein said bobbin is integrally formed with said housing for receiving said elastic means.

* * * * *